(12) United States Patent
Imanishi et al.

(10) Patent No.: US 9,029,030 B2
(45) Date of Patent: May 12, 2015

(54) FUEL CELL SYSTEM INCLUDING SOFT SWITCHING BOOST CONVERTER

(75) Inventors: Hiroyuki Imanishi, Toyota (JP); Kota Manabe, Toyota (JP); Nobuyuki Kitamura, Minamitsuru-gun (JP); Takahiko Hasegawa, Toyota (JP); Atsuo Kawamura, Yokohama (JP); Yukinori Tsuruta, Yokohama (JP)

(73) Assignees: Toyota Jidosha Kabushiki Kaisha, Toyota-Shi (JP); National University Corporation Yokohama National University, Yokohama (JP)

( * ) Notice: Subject to any disclaimer, the term of this patent is extended or adjusted under 35 U.S.C. 154(b) by 0 days.

(21) Appl. No.: 13/516,163

(22) PCT Filed: Dec. 16, 2010

(86) PCT No.: PCT/IB2010/003266
§ 371 (c)(1),
(2), (4) Date: Jun. 14, 2012

(87) PCT Pub. No.: WO2011/073777
PCT Pub. Date: Jun. 23, 2011

(65) Prior Publication Data
US 2012/0295174 A1 Nov. 22, 2012

(30) Foreign Application Priority Data
Dec. 18, 2009 (JP) ................................. 2009-287094

(51) Int. Cl.
*H01F 29/14* (2006.01)
*H01F 27/245* (2006.01)
(Continued)

(52) U.S. Cl.
CPC ............... *H02M 1/34* (2013.01); *H01F 27/245* (2013.01); *H01F 17/04* (2013.01); *H01F 29/146* (2013.01); *H02M 2001/342* (2013.01); *Y02B 70/1491* (2013.01)

(58) Field of Classification Search
CPC ..... H01F 29/146; H01F 27/245; H01F 17/04; H02M 1/34; Y02B 70/1491
USPC ........................... 323/259, 272, 344; 363/59; 429/400–535
See application file for complete search history.

(56) References Cited

U.S. PATENT DOCUMENTS

| | | | |
|---|---|---|---|
| 5,828,559 A | 10/1998 | Chen | |
| 6,281,776 B1 * | 8/2001 | Davidson | ........................ 336/61 |

(Continued)

FOREIGN PATENT DOCUMENTS

| | | |
|---|---|---|
| CN | 1788410 A | 6/2006 |
| JP | 63032906 A | 2/1988 |

(Continued)

OTHER PUBLICATIONS

International Search Report and Written Opinion of PCT/IB2010/003266 mailed May 3, 2011.

(Continued)

*Primary Examiner* — Kenneth Douyette
*Assistant Examiner* — James Lee
(74) *Attorney, Agent, or Firm* — Kenyon & Kenyon LLP

(57) ABSTRACT

A voltage boost converter includes: a main voltage boost portion that has a first switch and a first coil, and that raises output voltage of a direct-current power source by using counter electromotive force of the coil caused by the switch performing a switching action on the coil; and a subsidiary voltage boost portion which has a capacitor that adjusts potential difference between two poles of the switch by amount of electricity stored, and which reduces switching loss of the switch by adjusting the amount of electricity in the capacitor during the switching action, and which has a second switch and a second coil. The second coil is formed by winding a wire around at least a portion of a core formed of a magnetic body. The core is provided with a gap formed of a non-magnetic body. A core region formed of a magnetic body is adjacent to the gap.

4 Claims, 8 Drawing Sheets

(51) Int. Cl.
*H01F 17/04* (2006.01)
*H02M 1/34* (2007.01)

(56) References Cited

U.S. PATENT DOCUMENTS

| | | |
|---|---|---|
| 2006/0209582 A1 | 9/2006 | Tsuruya |
| 2007/0195562 A1 | 8/2007 | Sato |
| 2010/0060404 A1* | 3/2010 | Raiser et al. .................. 336/212 |
| 2010/0291445 A1* | 11/2010 | Igarashi ........................ 429/428 |

FOREIGN PATENT DOCUMENTS

| | | |
|---|---|---|
| JP | 01-110064 A | 4/1989 |
| JP | 05-093025 A | 12/1993 |
| JP | 07-307648 A | 11/1995 |
| JP | 2001-224165 A | 8/2001 |
| JP | 2003-018833 A | 1/2003 |
| JP | 2003-217625 A | 7/2003 |
| JP | 2005-143259 A | 6/2005 |
| JP | 2007-228694 A | 9/2007 |
| JP | 2009-165246 A | 7/2009 |

OTHER PUBLICATIONS

Office Action dated Jan. 24, 2012 in JP 2009-287094 and English translation thereof.

Translation of Office Action issued on Oct. 1, 2012 in JP 2009-287094.

* cited by examiner

FUEL CELL SYSTEM INCLUDING SOFT SWITCHING BOOST CONVERTER

This is a 371 national phase application of PCT/IB2010/003266 filed 16 Dec. 2010, claiming priority to Japanese Patent Application No. 2009-287094 filed 18 Dec. 2009, the contents of which are incorporated herein by reference.

BACKGROUND OF THE INVENTION

1. Field of the Invention

The invention relates to a fuel cell system.

2. Description of the Related Art

In recent years, fuel cells are drawing attention as an electric power source that is excellent in operation efficiency and environmental friendliness. The fuel cells are able to output an electric power commensurate with a demand of load by controlling the amount of supply of a fuel gas. In some cases, however, the output voltage of a fuel cell does not equal the voltage that is demanded by a load. Therefore, a technology that makes the output voltage of a fuel cell equal to the voltage that a load demands, by converting the output voltage of the fuel cell via a DC/DC converter has been proposed (see, e.g., Japanese Patent Application Publication No. 2003-217625 (JP-A-2003-217625)).

The DC/DC converter has an electronic switch, a diode and an inductance as basic elements, and changes voltage through the switching action of the electronic switch. Since ripples occur due to the switching action of the electronic switch, the DC/DC converter is equipped with a snubber circuit that absorbs the ripples. The snubber circuit absorbs ripples by a capacitor. If the charge stored in the capacitor is not utilized, the energy conversion efficiency of the DC/DC converter declines. Therefore, technologies for effective utilization of the charge stored in a capacitor by regeneration have been proposed (see, e.g., Japanese Patent Application Publication No. 2005-143259 (JP-A-2005-143259)).

The DC/DC converter is known to be able to reduce the switching loss by performing soft switching. However, if this is employed to boost the voltage of the fuel cell, there is a possibility that the electric power stored for the soft switching may be input to the fuel cell. Thus, application of the DC/DC converter is difficult. Therefore, a fuel cell system capable of boosting the output voltage of the fuel cell by performing the soft switching which is described in Japanese Patent Application Publication No. 2009-165246 (JP-A-2009-165246) has been proposed.

The fuel cell system described in Japanese Patent Application Publication No. 2009-165246 (JP-A-2009-165246) is equipped with a voltage boost converter. The voltage boost converter has: a main voltage boost portion that has a first switch (constructed of a switch element and a diode) and a first coil, and that boosts the output voltage of the fuel cell by the counter electromotive force that is caused in the first coil by the first switch performing the switching action on the first coil; and a subsidiary voltage boost portion which has a capacitor that adjusts the potential difference between the two poles of the first switch by the amount of electricity stored in the capacitor, and which reduces the switching loss of the first switch by adjusting the stored amount of electricity of the capacitor during the switching action, and which includes a second switch (constructed of a switch element and a diode) and a second coil.

Incidentally, in the voltage boost converter as described above, if both the first switch and the second switch are turned off, reverse current instantaneously flows into the diode of the second switch, and then instantaneously stops. Due to this phenomenon, surge voltage occurs. In order to cope with this phenomenon, the present inventors conducted experiments in an arrangement in which a diode was added to the subsidiary voltage boost portion, and a cathode was connected between the second switch and the second coil, and observed the occurrence of a phenomenon in which surge voltage occurred, and caused overvoltage destruction of the added diode.

For this phenomenon, it is considered useful to add a third coil that serves as a saturable reactor, and it is also conceivable to cause the second coil as a resonance reactor to perform the added saturable reactor function. Thus, a technology in which the resonance reactor is provided with a saturable reactor characteristic has also been proposed (see, e.g., Japanese Patent Application Publication No. 2003-018833 (JP-A-2003-018833)).

Incidentally, Japanese Patent Application Publication No. 2003-018833 (JP-A-2003-018833) describes the resonant reactor as follows. Concretely, the resonant reactor has a winding wire that is a Litz wire (stranded wire), and its core has a toroidal shape. As for the core of the resonant reactor, its outside diameter and inside diameter are substantially equal to those of the core of a flyback transformer, and the thickness thereof is substantially equal to or smaller than that of the core of the flyback transformer. Besides, with regard to the magnetization characteristic of the core of the resonant reactor, the foregoing application describes that the core is unsaturated when the electric current flowing the resonant reactor is within a predetermined range, and that the inductance value thereof is substantially constant in such a region, and that in a region in which the electric current is above the predetermined range, the core is saturated and the inductance value decreases.

Thus, Japanese Patent Application Publication No. 2003-018833 (JP-A-2003-018833) describes the function or the like of a resonant reactor that has saturability characteristic, but does not clearly describe the construction thereof. Thus, according to this patent application, it is unclear what type of saturable reactor is suitable for a voltage boost converter of a fuel cell system.

SUMMARY OF INVENTION

The invention provides a fuel cell system that has, in a voltage boost converter, a resonant reactor provided with a suitable saturability characteristic.

A first aspect of the invention relates to a fuel cell system that includes a fuel cell that is a direct-current power source, and a voltage boost converter that raises output voltage of the fuel cell and that supplies electricity to a load. In this fuel cell system, the voltage boost converter includes: a main voltage boost portion that has a first switch and a first coil, and that raises the output voltage of the fuel cell by using counter electromotive force of the first coil which is caused by the first switch performing a switching action on the first coil; and a subsidiary voltage boost portion which has a capacitor that adjusts potential difference between two poles of the first switch by amount of electricity stored in the capacitor and which reduces switching loss of the first switch by adjusting the amount of electricity stored in the capacitor during the switching action. The subsidiary voltage boost portion has a second switch and a second coil. The second coil is formed by winding a winding wire around at least a portion of a core that is formed of a magnetic body. The core is provided with a gap that is formed of a non-magnetic-body, and a core region formed of a magnetic body is provided adjacent to the gap.

A second aspect of the invention relates to a fuel cell system. This fuel cell system includes a fuel cell that is a direct-current power source, and a voltage boost converter that raises output voltage of the fuel cell and supplies electricity to a load. Besides, in this fuel cell system, the voltage boost converter includes: a main voltage boost portion that has a first switch and a first coil, and that raises the output voltage of the fuel cell by using counter electromotive force of the first coil which is caused by the first switch performing a switching action on the first coil; and a subsidiary voltage boost portion which has a capacitor that adjusts potential difference between two poles of the first switch by amount of electricity stored in the capacitor and which reduces switching loss of the first switch by adjusting the amount of electricity stored in the capacitor during the switching action. The subsidiary voltage boost portion has a second switch and a second coil. The second coil is formed by winding a winding wire around at least a portion of a core that is formed of a magnetic body. The core is provided with a gap that is formed of a non-magnetic body, and a core region formed of a magnetic body is provided adjacent to the gap.

According to the foregoing aspects of the invention, since the second coil that functions as a resonance reactor in the subsidiary boost portion of the voltage boost converter is formed by winding a wire around at least a portion of a core formed of a magnetic body, and providing a gap in the core, and providing a core region adjacent to the gap, the second coil can be caused to function as a saturable reactor that has saturability characteristic. More concretely, due to the formation of the core region made of a magnetic body adjacent to a portion in which the gap is formed, the core region becomes a path having small magnetic resistance, so that the inductance value can be heightened at the low-current side. Since the core region is adjacent to the gap, the core region is small in capacity as a path through which magnetism passes through, unlike other core portions, the core region at the high-current side is saturated, so that at the high-current side, the inductance value can be lowered as in the case where gaps are fully formed. Therefore, in the case where the first switch and the second switch are turned off together, the second coil can function as a reactor that restrains the surge voltage, and overvoltage destruction of other devices that constitute the subsidiary voltage boost portion can be prevented.

In the foregoing fuel cell system, the core region may be provided adjacent to the gap so as to form a magnetic path that has smaller magnetic resistance than the core. In the fuel cell system, the core may have a plurality of core members, and the gap and the core region are provided in each of spaces between the core members. In the fuel cell system, the core region may be in contact with the core.

According to the foregoing aspects of the invention, it is possible to provide a fuel cell system having in the voltage boost converter a resonant reactor that has an suitable saturability characteristic.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
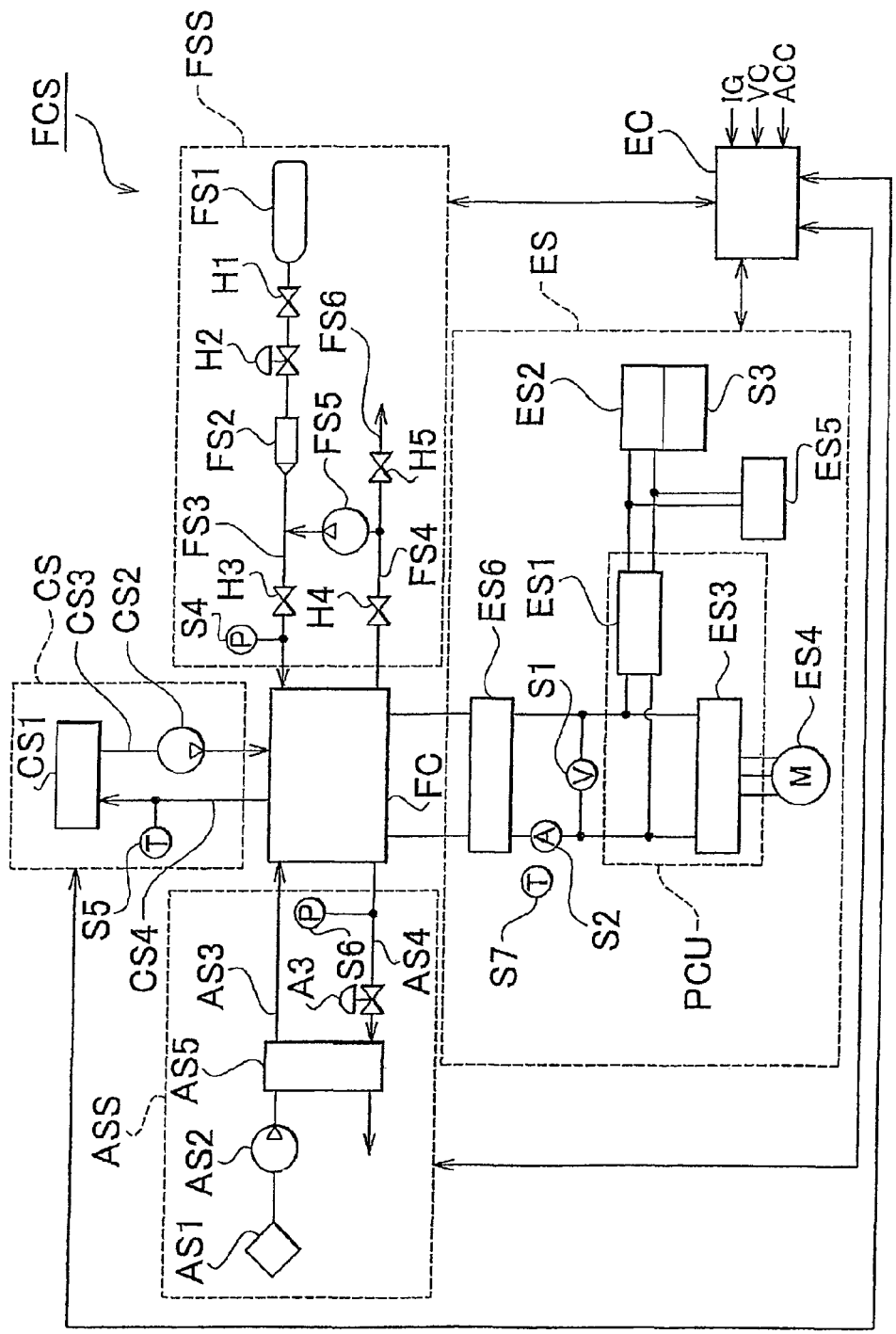
FIG. 1 is a general construction diagram showing a fuel cell system that adopts a voltage boost converter in accordance with an embodiment of the invention.

Hereinafter, embodiments of the invention will be described with reference to the accompanying drawings. To facilitate the understanding of the foregoing description, the same component elements in the drawings are denoted by the same characteristics as much as possible, and redundant descriptions are avoided below.

Firstly, a fuel cell system FCS of an embodiment of the invention that is mounted in a fuel cell vehicle will be described with reference to FIG. 1. FIG. 1 is a diagram showing a system construction of the fuel cell system FCS that functions as a vehicle-mounted electric power source system of a fuel cell vehicle. The fuel cell system FCS can be mounted in various vehicles, including a fuel cell motor vehicle (FCHV), an electric motor vehicle, a hybrid motor vehicle, etc.

The fuel cell system FCS is equipped with a fuel cell FC, an oxidizing gas supply system ASS, a fuel gas supply system FSS, an electric power system ES, a cooling system CS, and a controller EC. The fuel cell FC generates electricity when supplied with reactant gases (a fuel gas and an oxidizing gas). The oxidizing gas supply system ASS is a system for supplying air as an oxidizing gas to the fuel cell FC. The fuel gas supply system FSS is a system for supplying hydrogen gas as a fuel gas to the fuel cell FC. The electric power system ES is a system for controlling the charging and discharging of electric power. The cooling system CS is a system for cooling the fuel cell FC. The controller EC (a control portion) is a controller that controls the entire fuel cell system FCS.

The fuel cell FC is a constructed as a solid polymer electrolyte type cell stack that is formed by stacking many cells (unit cells (electricity generation bodies) each of which includes an anode, a cathode and an electrolyte) in series. In a usual operation of the fuel cell FC, an oxidation reaction expressed by equation (1) occurs at the anode, and a reduction reaction expressed by equation (2) occurs at the cathode. In the fuel cell FC as a whole, an electrogenic reaction expressed by equation (3) occurs.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

The oxidizing gas supply system ASS has an oxidizing gas channel AS3 and an oxidation off-gas channel AS4. The oxidizing gas channel AS3 is a channel through which an oxidizing gas to be supplied to the cathode of the fuel cell FC flows. The oxidation off-gas channel AS4 is a channel through which an oxidation off-gas discharged from the fuel cell FC flows.

The oxidizing gas channel AS3 is provided with an air compressor AS2 and a humidifier AS5. The air compressor AS2 is a compressor for taking in the oxidizing gas from the atmosphere through a filter AS1. The humidifier AS5 is a humidifier for humidifying the oxidizing gas pressurized by the air compressor AS2.

The oxidation off-gas channel AS4 is provided with a pressure sensor S6, a back pressure regulating valve A3 and the humidifier AS5. The back pressure regulating valve A3 is a valve for adjusting the oxidizing gas supply pressure. The humidifier AS5 is provided for carrying out moisture exchange between the oxidizing gas (dry gas) and the oxidation off-gas (Wet gas).

The fuel gas supply system FSS has a fuel gas supply source FS1, a fuel gas channel FS3, a circulation channel FS4, a circulation pump FS5, and an exhaust drain channel FS6. The fuel gas channel FS3 is a channel through which the fuel gas supplied from the fuel gas supply source FS1 to the anodes of the fuel cell FC flows. The circulation channel FS4 is a channel for returning the fuel off-gas discharged from the fuel cell FC into the fuel gas channel FS3. The circulation pump FS5 is a pump that pumps the fuel off-gas in the circulation channel FS4 to the fuel gas channel FS3. The exhaust drain channel FS6 is a channel connected to the circulation channel FS4 as a branch.

The fuel gas supply source FS1 is constructed of, for example, a high-pressure hydrogen tank, a hydrogen storage alloy, etc., and stores a hydrogen gas at high pressure (e.g., 35 MPa to 70 MPa). When a shutoff valve H1 is opened, the fuel gas flows out from the fuel gas supply source FS1 into the fuel gas channel FS3. The fuel gas is depressurized by a regulator H2 and an injector FS2 to, for example, about 200 kPa, and is then supplied to the fuel cell FC.

The fuel gas channel FS3 is provided with the shutoff valve H1, the regulator H2, the injector FS2, a shutoff valve H3, and a pressure sensor S4. The shutoff valve H1 is a valve for shutting off and permitting the supply of the fuel gas from the fuel gas supply source FS1. The regulator 112 is provided for adjusting the pressure of the fuel gas. The injector FS2 controls the amount of the fuel gas supplied to the fuel cell FC. The shutoff valve H3 is a valve for shutting off the supply of the fuel gas to the fuel cell FC.

The regulator H2 is a device that regulates an upstream-side pressure (primary pressure) to a pre-set secondary pressure, and is constructed of, for example, a mechanical pressure reducing valve that reduces the primary pressure, or the like. The mechanical pressure reducing valve has a casing in which a back pressure chamber and a pressure regulating chamber are formed on the opposite sides of a diaphragm. Using the back pressure in the back pressure chamber, the pressure reducing valve reduces the primary pressure to the secondary pressure by a predetermined pressure in the pressure regulating chamber. The regulator H2 is disposed at an upstream side of the injector FS2, so that the upstream-side pressure of the injector FS2 can be effectively reduced.

The injector FS2 is an electromagnetically driven type open-close valve capable of adjusting the amount of gas flow and the gas pressure by separating the valve body from the valve seat through the direct electromagnetic driving of the valve body on a predetermined driving cycle. The injector FS2 includes the valve seat that has a jetting hole through which a gaseous fuel, such as a fuel gas or the like, is jetted, a nozzle body that supplies and guides the gaseous fuel to the jetting hole, and the valve body that is housed and held so as to be movable in the direction of an axis (the gas flow direction) in order to open and close the jetting hole.

The valve body of the injector FS2 is constructed so as to be driven by a solenoid that is an electromagnetic drive device, and so as to be able to control the gas jetting duration and the gas jetting timing of the injector FS2 according to a control signal from the controller EC. In order to supply a demanded amount of gas flow to the downstream side, the injector FS2 adjusts the amount of gas flow (or the molar concentration of hydrogen) supplied to the downstream side, by changing at least one of the area of the opening (or the degree of the opening) and the open duration of the valve body provided in a gas channel of the injector FS2.

The circulation channel FS4 is provided with a shutoff valve H4. The exhaust drain channel FS6 is connected to the circulation channel FS4. The exhaust drain channel FS6 is provided with an exhaust drain valve H5. The exhaust drain valve H5 is a valve for discharging moisture and a fuel off-gas containing impurities in the circulation channel FS4 to the outside by actuating the valve H5 according to a command from the controller EC. As the exhaust drain valve H5 is opened, the concentration of the impurities in the fuel off-gas in the circulation channel FS4 decreases, so that the hydrogen concentration in the fuel off-gas circulating in the circulation system increases.

The fuel off-gas discharged via the exhaust drain valve H5 is mixed with the oxidation off-gas that flows in the oxidation off-gas channel AS4, and the mixture is diluted by a diluter (not shown). The circulation pump FS5 circulates the fuel off-gas in the circulation system and supplies it to the fuel cell FC when driven by an electric motor.

The electric power system ES includes a DC/DC converter ES1, a battery ES2, a traction inverter ES3, a traction motor ES4, an accessories ES5, and an FC voltage boost converter ES6. The fuel cell system FCS is constructed as a parallel hybrid system in which the DC/DC converter ES1 and the traction inverter ES3 are connected to the fuel cell FC in parallel with each other. The DC/DC converter ES1 and the traction inverter ES3 constitute a PCU (Power Control Unit).

The FC voltage boost converter ES6 is a DC/DC converter that has a function of boosting the output voltage of the fuel cell FC and outputting the boosted voltage toward the traction inverter ES3 and the traction motor ES4. The DC/DC converter ES1 has a function of boosting the direct-current voltage supplied from the battery ES2 and outputting the boosted voltage to the traction inverter ES3, and a function of dropping the voltage of the direct-current power generated by the fuel cell FC or the regenerated electric power that the traction motor ES4 recovers during the regenerative braking and charging the dropped voltage into the battery ES2. Due to these functions of the DC/DC converter ES1, the charging/discharging of the battery ES2 is controlled. Besides, due to the voltage conversion control by the DC/DC converter ES1, the operation point of the fuel cell FC (the output terminal voltage or the output current thereof) is controlled. A voltage sensor S1 and an electric current sensor S2 are attached to the fuel cell FC. The voltage sensor S1 is a sensor for detecting the voltage that is boosted from the output terminal voltage of the fuel cell FC by the FC voltage boost converter ES6. The electric current sensor S2 is a sensor for detecting the output current of the fuel cell FC. Besides, a temperature sensor S7 is provided between the voltage boost converter ES6 and the traction inverter ES3.

The battery ES2 functions as a storage for surplus electric power, a storage for regenerative energy recovered during the regenerative braking, and an energy buffer for load changes associated with acceleration or deceleration of the fuel cell vehicle. The battery ES2 is preferred to be a secondary battery, for example, nickel-cadmium storage battery, nickel metal hydride storage battery, a lithium secondary battery, etc. The battery ES2 is provided with an SOC sensor S3 for detecting the SOC (State of Charge) of the battery ES2.

The traction inverter ES3 is, for example, a PWM inverter that is driven in a pulse modulation method. The traction inverter ES3, in accordance with a control command from the controller EC, converts the direct-current voltage from the fuel cell FC or the battery ES2 into three-phase alternating-current voltage, and controls the rotating torque of the traction motor ES4. The traction motor ES4 is, for example, a three-phase alternating-current motor, and constitutes a motive power source of the fuel cell vehicle.

The accessories ES5 include electric motors that are disposed in various portions in the fuel cell system FCS (e.g., the motive power sources of pumps and the like), inverters and the like for driving these motors, and various kinds of vehicle-mounted accessories (e.g., an air compressor, injectors, a coolant circulation pump, a radiator, etc.).

The cooling system CS has a radiator CS1, a cooling liquid pump CS2, a cooling liquid outgoing path CS3, and a cooling liquid incoming path CS4. The radiator CS1 cools a cooling liquid provided for cooling the fuel cell FC, by promoting heat dissipation from the cooling liquid. The cooling liquid pump CS2 is a pump for circulating the cooling liquid between the fuel cell FC and the radiator CS1. The cooling liquid outgoing path CS3 is a channel that connects the radiator CS1 and the fuel cell FC, and is provided with the cooling liquid pump CS2. As the cooling liquid pump CS2 is driven, the cooling liquid flows from the radiator CS1 to the fuel cell FC through the cooling liquid outgoing path CS3. The cooling liquid incoming path CS4 is a channel that connects the fuel cell FC and the radiator CS1, and is provided with a water temperature sensor S5. As the cooling liquid pump CS2 is driven, the cooling liquid having cooled the fuel cell FC flows back to the radiator CS1.

The controller EC (control portion) is a computer system that includes a CPU, ROM, RAM and input/output interfaces, and controls various portions of the fuel cell system FCS. For example, the controller EC, upon receiving an initiation signal IG from the ignition switch, starts to operate the fuel cell system FCS. After that, the controller EC finds a demanded electric power of the entire fuel cell system FCS on the basis of an accelerator operation amount signal ACC input from an accelerator sensor, a vehicle speed signal VC input from a vehicle speed sensor, etc. The demanded electric power of the entire fuel cell system FCS is the sum of vehicle drive electric power required to drive the vehicle, and accessory electric power.

The accessory electric power includes the electric power consumed by vehicle-mounted accessories (e.g., a humidifier, an air compressor, a hydrogen pump, a coolant circulation pump, etc.), the electric power consumed by devices that are needed during traveling (e.g., a transmission, a road wheel control device, a steering device, a suspension device, etc.), the electric power consumed by devices that are installed in a cabin space (e.g., an air-conditioning device, illuminators, an audio device, etc.), etc.

The controller EC determines the distribution of the output electric power between the fuel cell FC and the battery ES2. The controller EC controls the oxidizing gas supply system ASS and the fuel gas supply system FSS so that the amount of electricity generated by the fuel cell FC becomes equal to a target electric power. Besides, the controller EC outputs an instruction signal to the DC/DC converter ES1 to cause the DC/DC converter ES1 to execute a converter control, thereby controlling the operation point of the fuel cell FC (the output terminal voltage or the output current thereof). Furthermore, the controller EC outputs, for example, U-phase, V-phase and W-phase alternating-current voltage command values as switching commands to the traction inverter ES3 to control the output torque and the rotation speed of the traction motor ES4 so as to achieve a target torque commensurate with the accelerator operation amount. Furthermore, the controller EC controls the cooling system CS so that the fuel cell FC has appropriate temperature.

Figure 2:
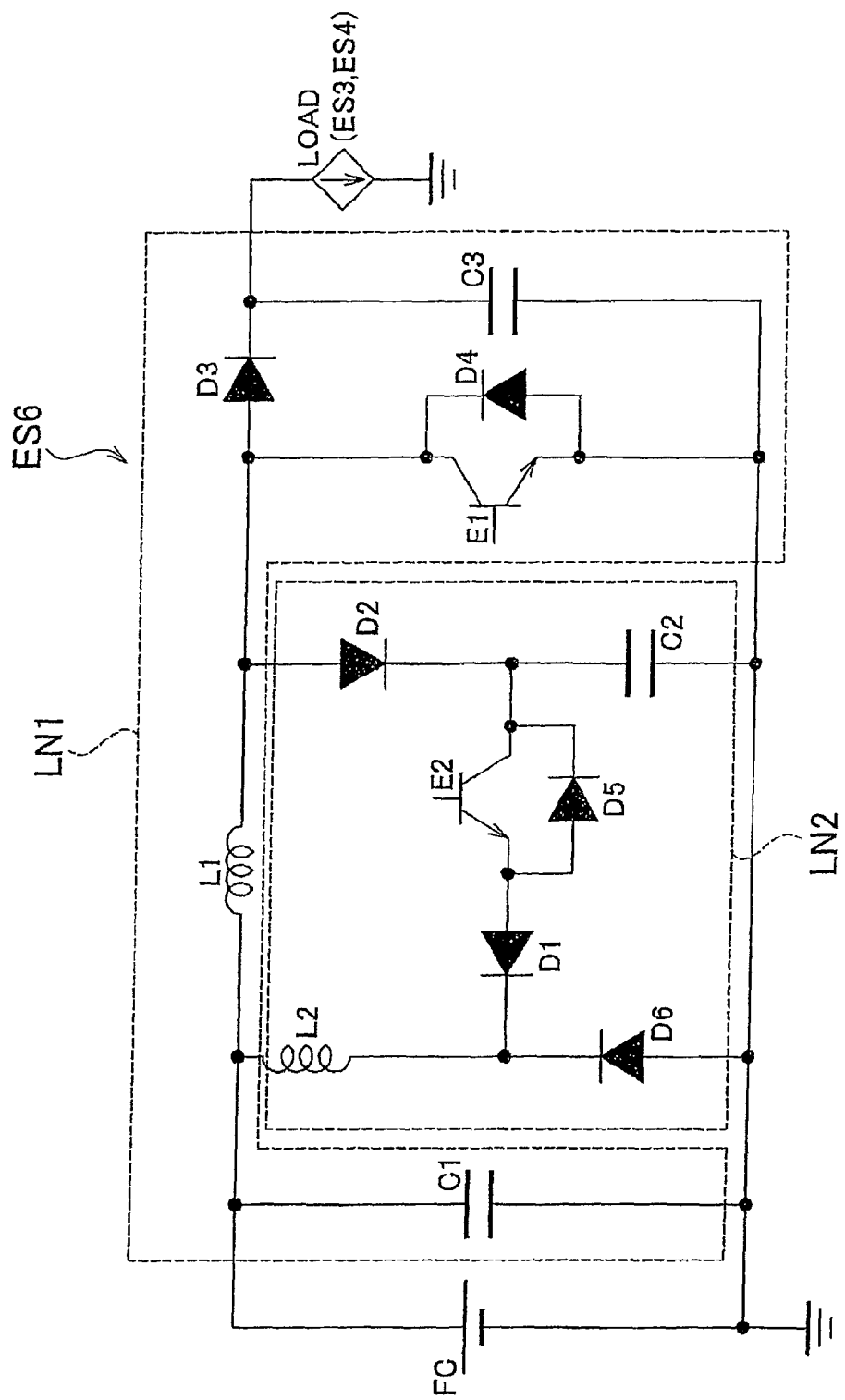
FIG. 2 is a diagram showing a circuit construction of a voltage boost converter for use in the fuel cell system shown in FIG. 1.

Features of an electric circuit of the FC voltage boost converter ES6 are described with reference to FIG. 2. FIG. 2 is a diagram showing an electrical construction of the fuel cell system FCS that includes the FC voltage boost converter ES6 as a central component. To simplify the illustration, the battery ES2, the DC/DC converter ES1 as the battery voltage boost converter, etc. are omitted from the illustration in FIG. 2.

The FC voltage boost converter ES6 is constructed of a main voltage boost circuit LN1 for boosting voltage as a DC/DC converter, and a subsidiary voltage boost circuit LN2 for performing a soft switching action.

The main voltage boost circuit LN1 boosts the output voltage of the fuel cell FC by releasing the energy stored in a coil L1 (first coil) to the traction motor ES4 side (the traction inverter ES3 side) via a diode D3 through a switching action of a switching circuit that is constructed of a switch element E1 (first switch) and a diode D4. Concretely, one end of the coil L1 is connected to a higher potential-side terminal of the fuel cell FC. The other end of the coil L1 is connected to one-end pole of the switch element E1. The other end pole of the switch element E1 is connected to the lower potential-side terminal of the fuel cell FC. Besides, the anode terminal of the diode D3 is connected to the other end of the coil L1. A capacitor C3, is connected between the cathode terminal of a diode D3 and the other end of the switch element E1. Incidentally, in the main voltage boost circuit LN1, the capacitor C3 functions as a smoothing capacitor for the boosted voltage. The main voltage boost circuit LN1 is also provided with a smoothing capacitor C1 at the fuel cell FC side, so that it is possible to reduce the ripple of the output current of the fuel cell FC. The voltage that acts across the smoothing capacitor C3 is the output voltage of the FC voltage boost converter ES6. Besides, the power source voltage of the fuel cell FC is the voltage that acts across the smoothing capacitor C1, and is the input voltage of the FC voltage boost converter ES6.

Next, the subsidiary voltage boost circuit LN2 includes a first in-series connected unit that is connected in parallel with the switch element E1 and that has a diode D2 and a snubber capacitor C2 that is connected in series to the diode D2. In this first in-series connected unit, the anode terminal of the diode D2 is connected to the other end of the coil L1, and the cathode terminal of the diode D2 is connected to one end of the snubber capacitor C2. The other end of the snubber capacitor C2 is connected to the lower potential-side terminal of the fuel cell FC. The subsidiary voltage boost circuit LN2 further includes a second in-series connected unit in which a coil L2 (second coil) that is an induction element, a diode D1, and a switching circuit constructed of a switch element E2 (second switch) and a diode D5 are connected in series. In this second in-series connected unit, one end of the switch element E2 is connected to a connecting site between the diode D2 and the snubber capacitor C2 of the first in-series connected unit. Furthermore, the cathode terminal of the diode D1 is connected to one end of the coil L2, and the anode terminal of the diode D1 is connected to the other-end pole of the switch element E2. Besides, the other end of the coil L2 is connected to the one end side of the coil L1. Besides, the subsidiary voltage boost circuit LN2 also includes a diode D6. The cathode terminal of the diode D6 is connected to a connecting site between the coil L2 and the diode D1 of the second in-series connected unit, and the anode terminal of the diode D6 is connected to the lower potential-side terminal of the fuel cell FC.

The FC voltage boost converter ES6 constructed as described above adjusts the switching duty ratio of the switch element E1 to control the boost ratio of the FC voltage boost converter ES6, that is, the ratio of the output voltage of the FC voltage boost converter ES6 applied to the traction inverter ES3 to the output voltage of the fuel cell FC that is input to the FC voltage boost converter ES6. Besides, since the switching action of the switch element E1 is accompanied by the switching action of the switch element E2 of the subsidiary voltage boost circuit LN2, so-called soft switching is realized, so that the switching of the FC voltage boost converter ES6 can be greatly reduced.

Figure 3:
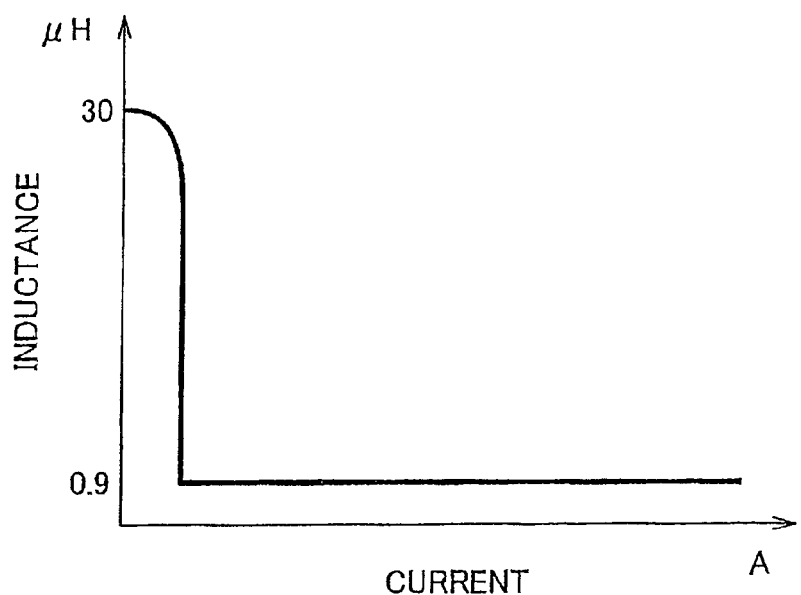
FIG. 3 is a diagram showing a characteristic of a resonance reactor provided with saturability characteristic which is for use in the voltage boost converter shown in FIG. 2.

Next, a resonance reactor having saturability characteristic which is used as the coil L2 will be described. FIG. 3 is a diagram showing an inductance characteristic of a resonance reactor that has saturability characteristic. As shown in FIG. 3, the resonance reactor is constructed so as to have an inductance value of 30 µH in a low current range and have an inductance value of 0.9 µH in a high current range. Generally, in this type of resonance reactor, a coil that has an inductance value of 30 µH in the low current range is connected in series to a coil that has an inductance value of 0.9 µH in the high current range. However, in this embodiment, a resonance reactor is given saturability characteristic, so that the foregoing inductance characteristic of a resonance reactor is realized by a single coil.

Figure 4:
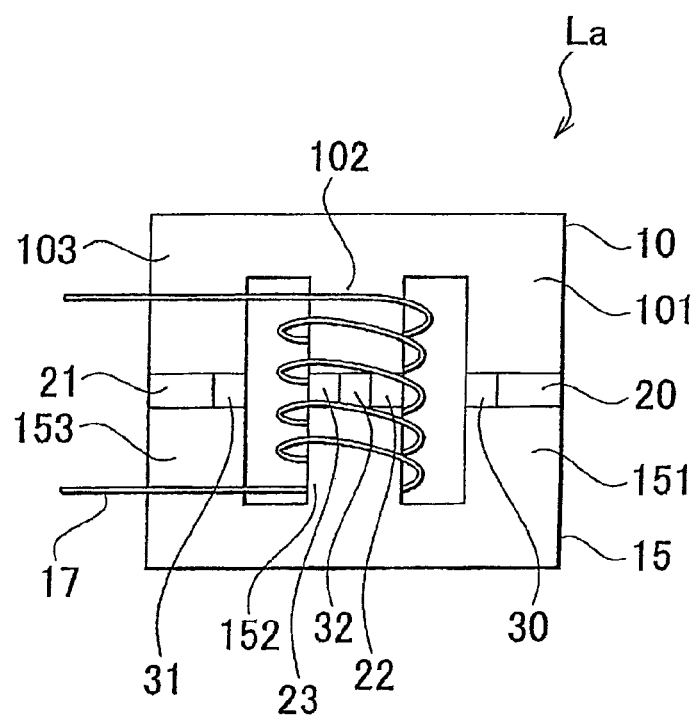
FIG. 4 is a diagram showing a resonance reactor provided with saturability characteristic which is for use in the voltage boost converter shown in FIG. 2.

A construction of a coil La that is used as the coil L2 and that serves as a resonance reactor having saturability characteristic is shown in FIG. 4. As shown in FIG. 4, the coil La is constructed of cores 10 and 15 made of a magnetic material, and a winding wire 17 formed by winding a copper wire.

The core 10 is an E-shaped core, and is provided with a center core 102 and side cores 101 and 103. The core 15 is also an E-shaped core, and is provided with a center core 152 and side cores 151 and 153. The core 10 and the core 15 are disposed so that the center core 102 and the center core 152 face each other, and the side core 101 and the side core 151 face each other, and the side core 103 and the side core 153 face each other. The winding wire 17 is wound around the center core 102 and the center core 152.

Gaps 22 and 23 are provided between the center core 102 and the center core 152. A core region 32 is provided between the gap 22 and the gap 23. The gaps 22 and 23 are formed of a non-magnetic body (e.g., a ceramic material), and the core region 32 is formed of a magnetic body. A gap 20 is provided between the side core 101 and the side core 151. A core region 30 is provided adjacent to the gap 20. The gap 20 is formed of a non-magnetic body (e.g., a ceramic material), and the core region 30 is formed of a magnetic body. A gap 21 is provided between the side core 103 and the side core 153. A core region 31 is provided adjacent to the gap 21. The gap 21 is formed of a non-magnetic body (e.g., a ceramic material), and the core region 31 is formed of a magnetic body.

Figure 5:
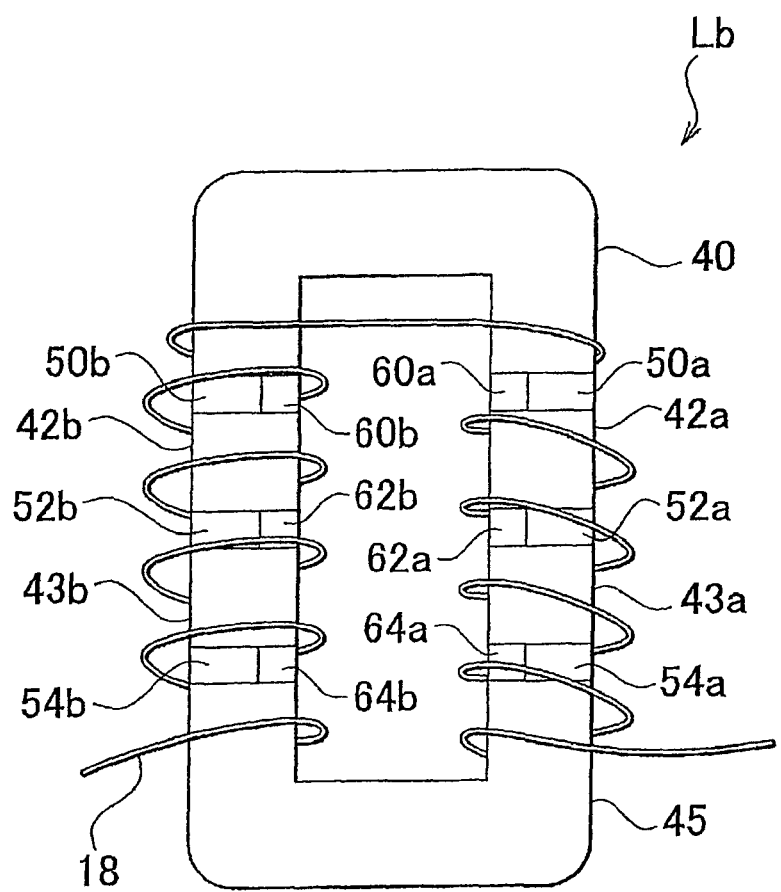
FIG. 5 is a diagram showing a resonance reactor provided with saturability characteristic which is for use in the voltage boost converter shown in FIG. 2.

A construction of a coil Lb as another example of a coil that is used as the coil L2 is shown in FIG. 5. As shown in FIG. 5, the coil Lb is composed of cores 40, 45, 42a, 42b, 43a and 43b that are formed of a magnetic material, and a winding wire 18 formed by winding a copper wire.

The cores 40 and 45 are U-shaped cores, and the cores 42a, 42b, 43a and 43b are I-shaped cores. The core 42a is disposed facing one of two leg portions (first leg portion) of the core 40. The core 42b is disposed facing the other leg portion (second leg portion) of the core 40. Besides, the core 43a is disposed facing one of the two leg portions of the core 45. The core 43b is disposed facing the other leg portion of the core 45. Furthermore, the core 42a and the core 43a face each other, and the core 42b and the core 43b face each other. Therefore, the cores 40, 45, 42a, 42b, 43a and 43b form an annular core. The winding wire 18 begins being wound around one of the two leg portions of the core 45, and then is wound around the cores 43a and 42a. After that, the winding wire 18 is passed from one of the two leg portions (first leg portion) of the core 40 to the other leg portion thereof, and then is wound around from the core 42b to the core 43b and then to the other leg portion (second leg portion) of the core 45.

A gap 50a is provided between the first leg portion of the core 40 and the core 42a. A core region 60a is provided adjacent to the gap 50a. A gap 52a is provided between the core 42a and the core 43a. A core region 62a is provided adjacent to the gap 52a. A gap 54a is provided between the core 43a and the first leg portion of the core 45. A core region 64a is provided adjacent to the gap 54a. A gap 50b is provided between the second leg portion of the core 40 and the core 42b. A core region 60b is provided adjacent to the gap 50b. A gap 52b is provided between the core 42b and the core 43b. A core region 62b is provided adjacent to the gap 52b. A gap 54b is provided between the core 43b and the second leg portion of the Core 45. A core region 64b is provided adjacent to the gap 54b.

The gaps 50a, 52a, 54a, 50b, 52b and 54b are formed of a non-magnetic body (e.g., a ceramic material), and the core regions 60a, 62a, 64a, 60b, 62b and 64b are formed of a magnetic body.

Figure 6:
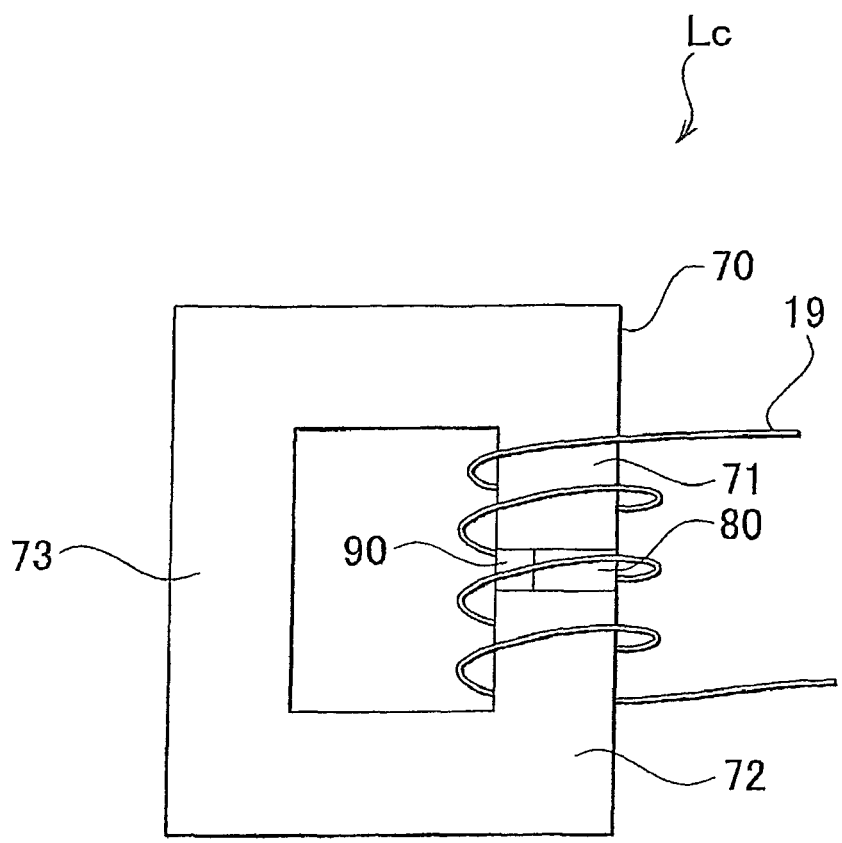
FIG. 6 is a diagram showing a resonance reactor provided with saturability characteristic which is for use in the voltage boost converter shown in FIG. 2.

Next, a construction of a coil Lc that is still another example of the coil that is used as the coil L2 will be described with reference to FIG. 6. As shown in FIG. 6, the coil Lc is constructed of a core 70 formed of a magnetic material, and a winding wire 19 formed by winding a copper wire.

The core 70 is a C-shaped core that has: a square U-shaped core portion 73; a core portion 71 extending from a first end of the core portion 73 toward a second end thereof; and a core portion 72 extending from the second end of the core portion 73 toward the first end thereof. A distal end of the core portion 71 and a distal end of the core portion 73 face each other. The winding wire 19 is wound around the core portion 71 and the core portion 72.

A gap 80 is provided between the distal end of the core portion 71 and the distal end of the core portion 72. A core region 90 is provided adjacent to the gap 80. The gap 80 is formed of a non-magnetic body (e.g., a ceramic material), and the core region 90 is formed of a magnetic body.

Figure 7:
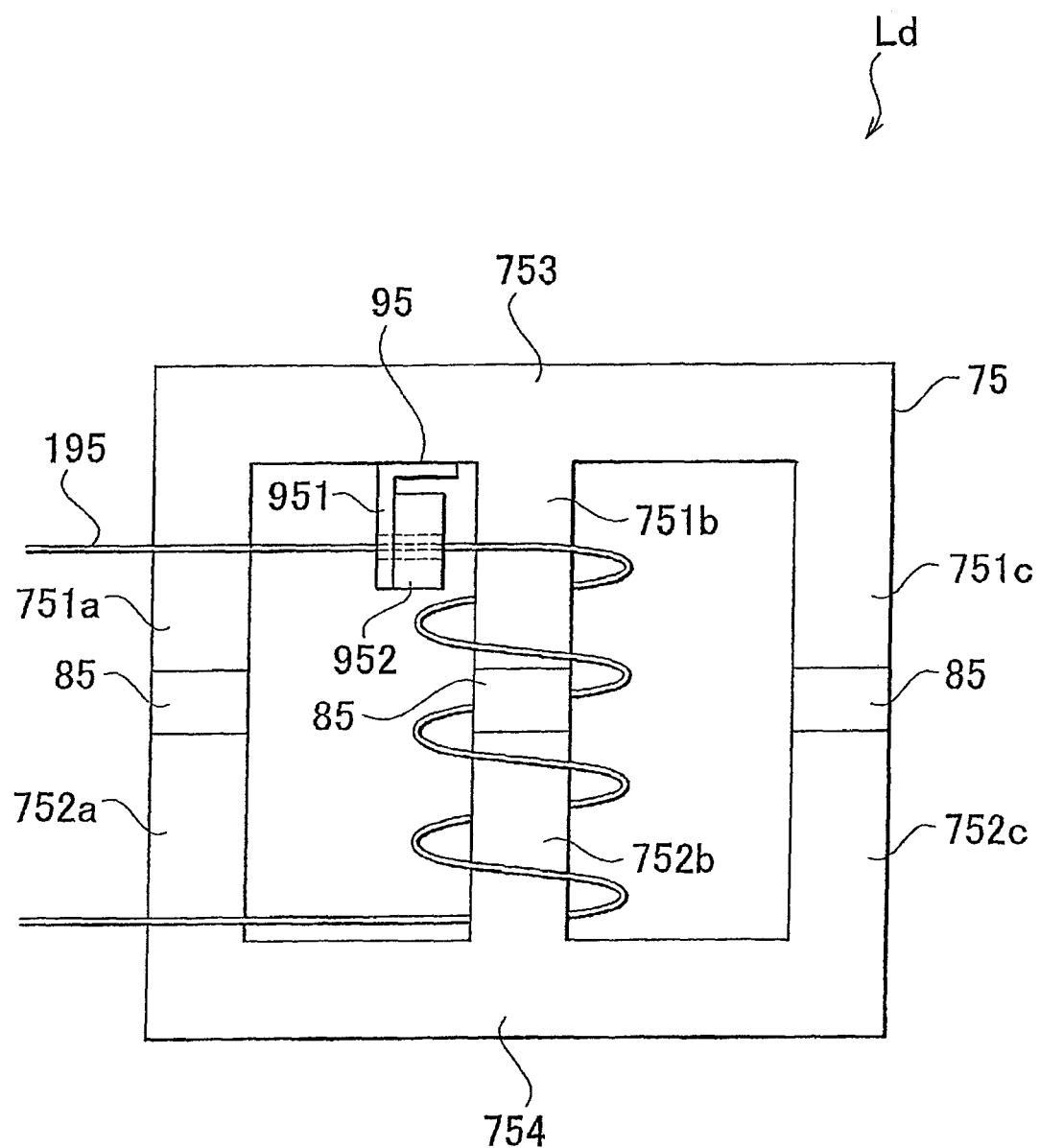
FIG. 7 is a diagram showing a resonance reactor provided with saturability characteristic which is for use in the voltage boost converter shown in FIG. 2.
Figure 8:
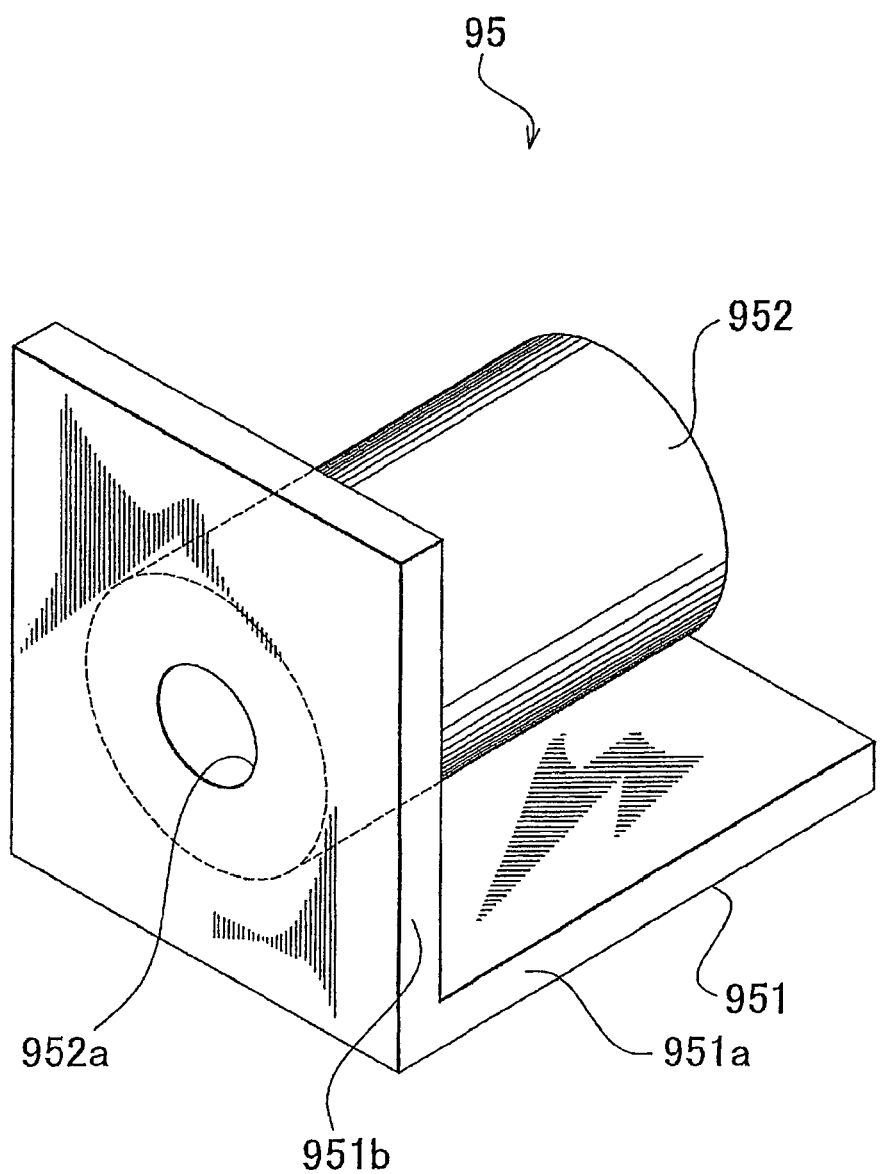
FIG. 8 is a diagram showing a saturable core for use in the resonance reactor shown in FIG. 7.

In the foregoing coils La, Lb and LC, saturable cores are provided by utilizing the spaces provided by gaps. However, considering the spirits of this invention, it is also preferable to provide a saturable core by utilizing an empty space of a main core which is other than the spaces of gaps. An example in which a magnetic body as a saturable core is incorporated in a portion other than a gap will be described with reference to FIGS. 7 and 8. FIG. 7 is a diagram showing a construction of a coil Ld that is yet another example of the coil that is used as the coil L2. FIG. 8 is a perspective view showing a construction of saturable core component parts 95 shown in FIG. 7. As shown in FIG. 7, the coil Ld is constructed of a core 75 formed of a magnetic material, a winding wire 195 formed by winding a copper wire, and the saturable core component parts 95.

The core 75 is formed by combining an E-shaped core 753 and an E-shaped core 754. The E-shaped core 753 has a side core 751a, a center core 751b and a side core 751c. The E-shaped core 754 has a side core 752; a center core 752b and a side core 752c. The E-shaped core 753 and the E-shaped core 754 are disposed so that the side core 751a and the side core 752a face each other, and the center core 751b and the center core 752b face each other, and the side core 751c and the side core 752c face each other. Gaps 85 are provided between the side core 751a and the side core 752a that face each other, and between the center core 751b and the center core 752b that face each other, and between the side core 751c and the side core 752c that face each other. Each gap 85 is formed of a non-magnetic body.

The saturable core component parts 95 are disposed in an internal space that is surrounded by the side core 751a, the center core 751b, the side core 752a and the center core 752b. The saturable core component parts 95 include a saturable core 952 and an L-shaped fixture 951 as shown in FIGS. 7 and 8. The saturable core 952 is formed of a magnetic body, and has a cylindrical shape with a hollow 952a formed therein. The L-shaped fixture 951 is constructed of an attachment portion 951a and a saturable core-attached portion 951b. The saturable core 952 is attached to the L-shaped fixture 951, extending from the saturable core-attached portion 951b in a direction that is the same as the direction in which the attachment portion 951a extends. In the saturable core component parts 95, the attachment portion 951a is closely attached to a wall surface of the internal space of the core 75. Therefore, if the saturable core 952 generates heat, the heat is transferred to the core 75 via the L-shaped fixture 951. The winding wire 195 is introduced from outside the core 75, and is passed through the hollow 952a of the saturable core 952, and then is wound around the center cores 751b and 752b. After that, the winding wire 195 is led out of the core 75.

In the coil Ld, since the saturable core 952 is incorporated by utilizing an unoccupied space in the core 75, which is a main core, in such a manner that heat generated from the saturable core 952 can be transferred to the main core 75, release of heat from the main core 75 and release of heat from the saturable core 952 can be carried out together. Thus, a construction in which "a saturable core region formed of a magnetic body is provided adjacent to a gap" is not limited to a construction in which a saturable core region is provided in contact with a gap, but also includes a construction in which despite being a predetermined distance apart from a gap, a core achieves a saturability characteristic, and can be cooled together with a main core.

Figure 9:
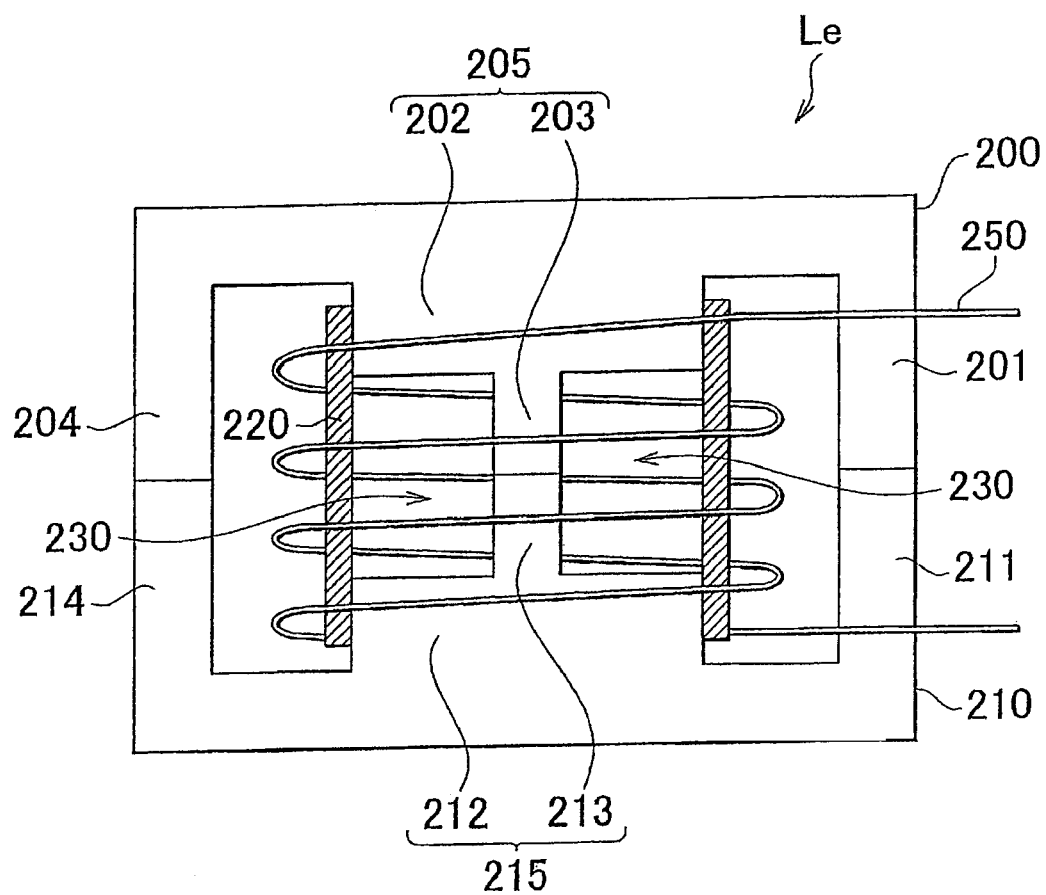
FIG. 9 is a diagram showing a resonance reactor provided with saturability characteristic which is for use in the voltage boost converter shown in FIG. 2.

Furthermore, a construction of a coil Le as another example of a coil that is used as the coil L2 is shown in FIG. 9. As shown in FIG. 9, the coil Le is constructed of cores 200 and 210 made of a magnetic material, a tubular member 220, and a winding wire 250 formed by winding a copper wire to the tubular member 220.

The core 200 is an E-shaped core, and is provided with a center core 205 and side cores 201 and 204. The core 210 is also an E-shaped core, and is provided with a center core 215 and side cores 211 and 214. The center core 205 includes a base portion 202 and a saturable core (core region) 203 which protrudes from a portion of the base portion 202. The center core 215 includes a base portion 212 and a saturable core (core region) 213 which protrudes from a portion of the base portion 212. The core 200 and the core 210 are disposed so that the saturable core 203 and the saturable core 213 are in contact with each other, and the side core 201 and the side core 211 are in contact with each other, and the side core 204 and the side core 214 are in contact with each other.

The saturable cores 203 and 213 and gap 230 is provided between the base portion 202 and the base portion 212. The gap 230 is formed of a non-magnetic body (e.g., air), and the saturable cores 203 and 213 are formed of a magnetic body. The tubular member 220 is formed so as to be provided on the outer surface of the base portions 202 and 212, and cover the gap 230. The winding wire 250 is wound around the tubular member 220.

The present invention may be applied not only to a single-phase circuit of the above embodiment but also to a plural-phases circuit (refer to FIG. 1 and FIG. 2). For example, the present invention may be applied to a three-phase interleaved circuit which is generated using three single-phase circuits, and in which one coil (reactor) L2 is used in the three circuits corresponding to the three phases.

The invention claimed is:

1. A fuel cell system comprising:
a fuel cell that is a direct-current power source, and
a voltage boost converter that raises output voltage of the fuel cell and supplies electricity to a load,
wherein the voltage boost converter includes:
a main voltage boost portion that has a first switch and a first coil, and that raises the output voltage of the fuel cell by using counter electromotive force of the first coil which is caused by the first switch performing a switching action on the first coil; and
a subsidiary voltage boost portion which has a capacitor that adjusts potential difference between two poles of the first switch by an amount of electricity stored in the capacitor and which reduces switching loss of the first switch by adjusting the amount of electricity stored in the capacitor during the switching action, and
the subsidiary voltage boost portion has a second switch and a second coil,
the second coil is formed by winding a winding wire around at least a portion of a core that is formed of a magnetic body,
the core has a first core member and a second core member that are spaced apart from one another with a space arranged in a first direction,
wherein the space between the first core member and the second core member includes a gap and a core region,
wherein the core region is adjacent to the gap in a second direction perpendicular to the first direction, and
the gap is formed of a non-magnetic body, and the core region is formed of a magnetic body.

2. The fuel cell system according to claim 1, wherein the core region is provided adjacent to the gap so as to form a magnetic path that has smaller magnetic resistance than the core.

3. The fuel cell system according to claim 1, wherein the core region is in contact with the core.

4. A direct-current power source system comprising:
a direct-current power source, and
a voltage boost converter that raises output voltage of the direct-current power source and that supplies electricity to a load,
wherein the voltage boost converter includes:
a main voltage boost portion that has a first switch and a first coil, and that raises the output voltage of the direct-current power source by using counter electromotive force of the first coil which is caused by the first switch performing a switching action on the first coil; and
a subsidiary voltage boost portion which has a capacitor that adjusts potential difference between two poles of the first switch by an amount of electricity stored in the capacitor and which reduces switching loss of the first switch by adjusting the amount of electricity stored in the capacitor during the switching action, and wherein the subsidiary voltage boost portion has a second switch and a second coil, the second coil is formed by winding a winding wire around at least a portion of a core that is formed of a magnetic body, the core has a first core member and a second core member that are spaced apart from one another with a space arranged in a first direction, wherein the space between the first core member and the second core member includes a gap and a core region, wherein the core region is adjacent to the gap in a second direction perpendicular to the first direction, and the gap is formed of a non-magnetic body, and the core region is formed of a magnetic body.

* * * * *